United States Patent [19]
Chen et al.

[11] Patent Number: 6,080,832
[45] Date of Patent: Jun. 27, 2000

[54] LOW-PRETILT ALIGNMENT LAYER MATERIAL

[75] Inventors: Fu-Lung Chen, Hsinchu; Ted Hong Shinn, Taipei; Wen Hishin Wang, Tainan; Chein-Dhau Lee, Hsinchu, all of Taiwan

[73] Assignee: Industrial Technology Research Institute, Hsinchu, Taiwan

[21] Appl. No.: 09/151,204

[22] Filed: Sep. 10, 1998

[51] Int. Cl.$^7$ .......................... C08G 73/10; C08G 69/26
[52] U.S. Cl. .................... 528/170; 528/125; 528/128; 528/171; 528/172; 528/173; 528/174; 528/179; 528/183; 528/185; 528/188; 528/220; 528/229; 528/350; 528/353
[58] Field of Search .................. 528/28, 26, 125, 528/128, 170–172, 173, 174, 179, 183, 185, 188, 220, 229, 350, 353

[56] References Cited

U.S. PATENT DOCUMENTS

| | | | |
|---|---|---|---|
| 5,087,689 | 2/1992 | Ohta et al. | 528/185 |
| 5,098,627 | 3/1992 | Yoshikawa et al. | 528/185 |
| 5,278,276 | 1/1994 | Ohta et al. | 528/185 |
| 5,288,843 | 2/1994 | Tamai et al. | 528/353 |
| 5,708,128 | 1/1998 | Oikawa et al. | 528/185 |
| 5,731,404 | 3/1998 | Auman et al. | 528/353 |

FOREIGN PATENT DOCUMENTS

| | | |
|---|---|---|
| 2650829 | 8/1989 | European Pat. Off. . |
| 0 455 032 A2 | 11/1991 | European Pat. Off. . |
| 0 575 083 A1 | 12/1993 | European Pat. Off. . |
| 0 601 813 A1 | 6/1994 | European Pat. Off. . |
| 0 579 545 A 1 | 7/1994 | European Pat. Off. . |
| 0 604 885 A1 | 7/1994 | European Pat. Off. . |
| 0 625 722 A2 | 11/1994 | European Pat. Off. . |
| 0 625 723 A2 | 11/1994 | European Pat. Off. . |
| 0 683 418 A2 | 11/1995 | European Pat. Off. . |
| 0708149 A1 | 4/1996 | European Pat. Off. . |
| 59-200216 | 11/1984 | Japan . |
| 4023832 | 1/1992 | Japan . |
| 4084127 | 3/1992 | Japan . |
| 4141625 | 5/1992 | Japan . |
| 5043687 | 2/1993 | Japan . |
| 5313169 | 11/1993 | Japan . |
| 6157434 | 6/1994 | Japan . |
| 6180448 | 6/1994 | Japan . |
| 6180449 | 6/1994 | Japan . |
| 6180451 | 6/1994 | Japan . |
| 7209650 | 8/1995 | Japan . |
| 7228777 | 8/1995 | Japan . |
| 7287235 | 10/1995 | Japan . |
| WO 93/00604 | 7/1993 | WIPO . |
| WO 93/21556 | 10/1993 | WIPO . |

*Primary Examiner*—P. Hampton-Hightower
*Attorney, Agent, or Firm*—Merchant & Gould, P.C.

[57] ABSTRACT

A diamine-containing polyamic acid alignment layer material provided by the polymerization of aromatic diamine and dianhydride, and having an excellent coating, adhesion and stability. After the polyamic acid alignment layer material is coated and cured at a high temperature, a polyamic acid alignment layer having a pretilt angle of below 2 degrees is formed due to a close ring reaction. The polyamic acid alignment layer with a low pretilt angle can be used in a TN (twisted nematic) type liquid crystal display.

6 Claims, No Drawings

LOW-PRETILT ALIGNMENT LAYER MATERIAL

BACKGROUND OF THE INVENTION

1. Field of the Invention

The present invention relates to a liquid crystal alignment polymer, more particularly to a polyarnic acid alignment layer material obtained by the polymerization of aromatic diamine with dianhydride, and able to form a liquid crystal alignment layer having a pretilt angle of below 2 degrees.

2. Description of the Prior Art

A liquid crystal display (LCD) plays an important role in recent displays because it is small in volume and light in weight, is easily portable, has low working voltages, power consumption and good properties, and can be produced in scale. Different pretilt angles are needed for applications in different types of liquid crystal displays. Therefore, it is necessary to develope different alignment layer materials in the electrooptical device market. Traditional alignment layers in a TN (twisted nematic) type liquid crystal display are tilted generally 2 to 4 degrees to the surface of the substrate so as to produce a liquid crystal display with low duty ratio. Recently, liquid crystal displays are being vigorously developed. It is particularly desirable to produce an alignment layer with much lower pretilt angle for use in a liquid crystal display with a high duty ratio. However, the lower the pretilt angle, the higher the working voltage and a greater slope of the voltage (V)-transmission (T) curve is necessary to improve the duty ratio and the contrast of the display.

The most important requirements for an alignment layer are: pretilt angle, coating and orientation which are directly aimed at the structure and finally the production of a liquid crystal display. The reason for having a pretilt angle is to prohibit the disclination loop of the liquid crystal display. If reverse-twist domains appear in the display, a disclination line is formed that causes the contrast to decrease. The quality of the coating will influence the evenness of layer thickness and the production of pin holes. If the alignment layer thickness is uneven or a pin hole is produced, the electrical current value becomes large and can even result in a short circuit. The orientation is caused by an interaction between the alignment layer and the liquid crystal material. When the alignment is not good, the display will have a defect because of the production of disclination loop.

The alignment layers are classified according to their uses and include a TN (twisted nematic) type liquid crystal display, a STN (super twisted nematic) type liquid crystal display, and a TFT (thin film transistor) type liquid crystal display. In order to meet the alignment requirement, dianhydride is normally used as a main component of a conventional alignment layer. However, the coating and scratch-resistance of the polymer formed from dianhydride generally can not achieve market requirements. Also several problems are created by its use, such as, poor yield and problems keeping a clean room in a liquid crystal factory full of powders.

In order to solve the above problems, EP 708149 and JP 06180448 disclose the addition of a siloxane-containing copolymer in alignment layer materials so as to increase the transparency and scratch-resistance of the resultant alignment layer. But the polarity of siloxane functional group is large and therefore the added copolymer causes problems with working voltages. JP 07287235 relates to the addition of linear structure in alignment layer materials. It has been found that this alignment layer can only be used in STN type liquid crystal displays since the pretilt angle of the formed alignment layer is increased. EP 683418 makes use of UV light to control the pretilt angle of the alignment layer by introducing some photosensitive resins in the alignment layer materials. To date, it is still not possible to obtain a very stable alignment layer and consequently there are problems with the liquid crystal display caused by use, time and temperature. In addition, EP 625722 discloses the use of a surface-treated silica to replace conventional alignment layers. A difficulty exists, however; mass production of silica is hard to achieve. JP 06180451 relates to the application of polyamideimide alignment layer in a chiral smetic liquid crystal display but such a liquid crystal display is not yet produced in scale.

Based on the above description, the present invention provides a new polyamic acid alignment layer material having a low pretilt angle, and the preparation thereof comprising adding a aromatic diamine functional group into conventional dianhydride and polymerizing the above mixture. The resultant polyarnic acid alignment layer obtained in the present invention possesses excellent coating and high adhesion.

SUMMARY OF THE INVENTION

One objective of the invention is to provide an alignment layer material having a pretilt angle of below 2 degrees and possessing a good coating with adhesion and stability, which can be used in a TN type liquid crystal display, particularly a TN type liquid crystal display with high duty ratio.

Another objective of the invention is to provide a polyamic acid alignment layer material which is aligned in one direction and tilted to a low pretilt angle and can achieve the market demands, such as good scratch-resistance and high transparency.

A further objective of the invention is to provide a polyamic acid alignment layer material having a low pretilt angle, which can be produced by polymerization so as to meet the requirement of industrial production.

It is still another objective of the present invention to provide a process of producing a new polyamic acid alignment layer material using the condensation polymerization of dianhydride and aromatic diamine.

It is still a further objective of the present invention to provide a TN type liquid crystal display with high duty ratio, wherein polyamic acid is used as a new alignment layer material so that the display has larger duty ratio, as well as, greater contrast and is suitable for various electrical appliances.

These and other objectives, advantages and features of the present invention will be understood more fully and appreciated by reference to the written specifications.

DETAILED DESCRIPTION OF THE INVENTION

The present invention relates to a new polyamic acid alignment layer material for use in a liquid crystal display and the preparation process thereof The alignment layer material capable of producing a pretilt angle of below 2 degrees is polyamic acid having the following repeating units:

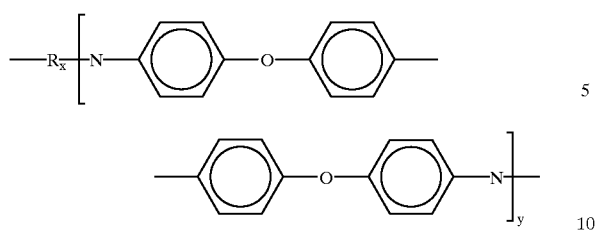

wherein R is tetracarboxyl and a ratio of x to y is from 0.8 to 1.2.

In the repeating units of polyamic acid alignment layer material of the present invention, R is tetracarboxyl and is selected from the group consisting of aromatic tetracarboxyl, non-aromatic tetracarboxyl such as aliphatic tetracarboxyl, and tetracarboxyl containing two or more aromatic groups and/or non-aromatic groups such as aliphatics. For instance, the suitable structure of tetracarboxyl is (a)
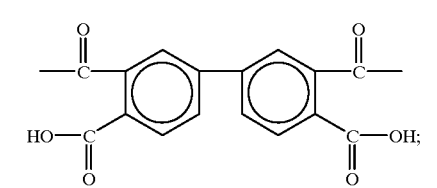

(b)
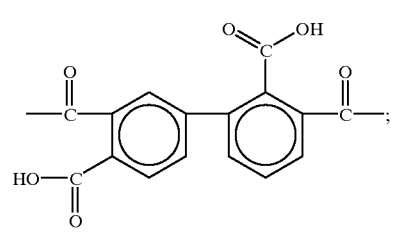

(c)
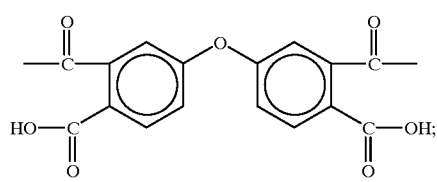

(d)
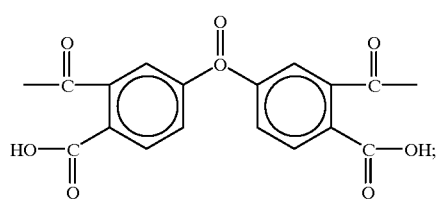

(e)
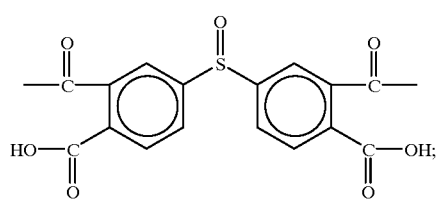

(f)
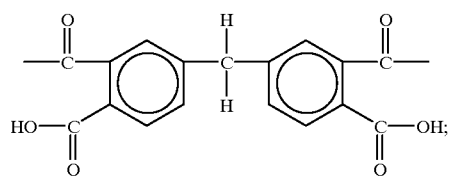

(g)
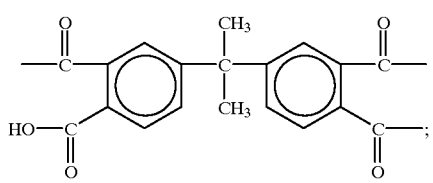

(h)
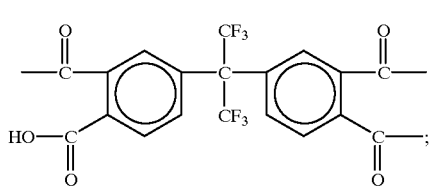

(i)
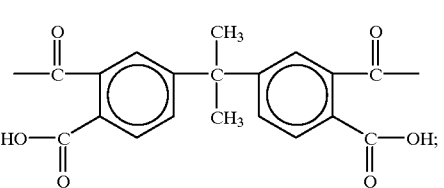

(j)
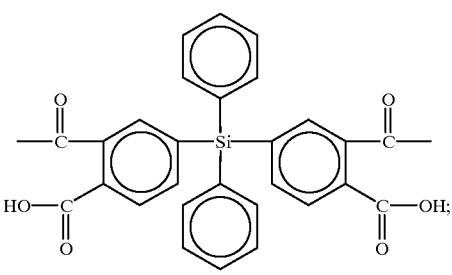

(k)
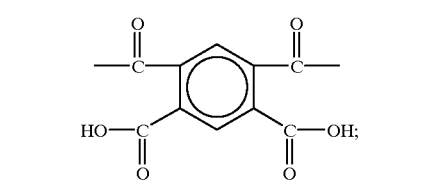

(l)
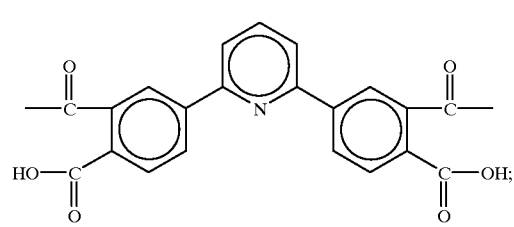

The dianhydride used in the present invention can be any conventional non-polar rigid structure and comprises aromatic tetracarboxyl, non-aromatic tetracarboxyl such as aliphatic tetracarboxyl, or tetracarboxyl containing two or more aromatic groups and/or non-aromatic groups such as aliphatics. The non-polar rigid structure, for example, is selected from:

(a)
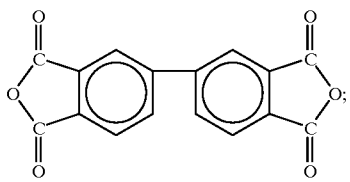

(b)
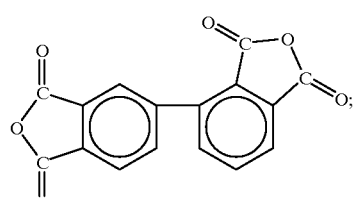

(c)
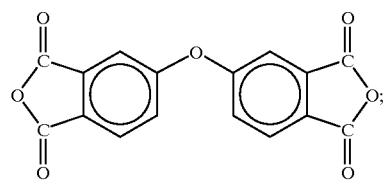

(d)
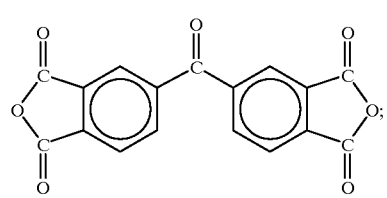

(e)
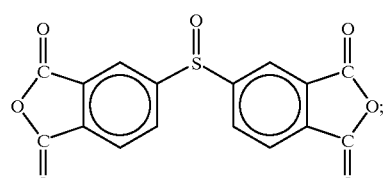

(f)
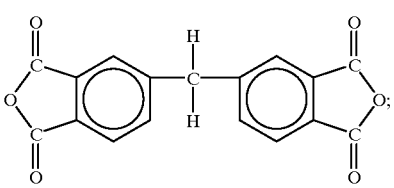

(m)
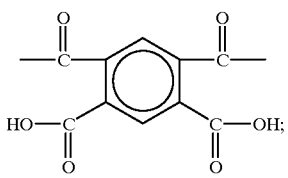

(n)
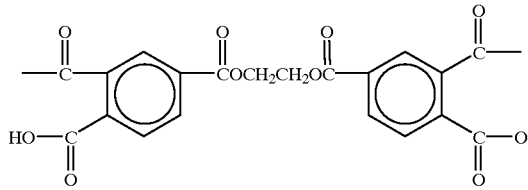

(o)
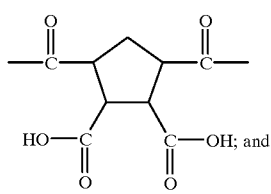

(p)
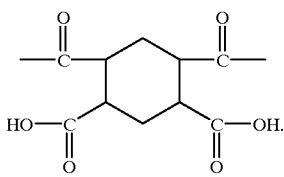

In the present invention, non-polar aromatic diamine functional group is introduced into the polymer chain of alignment layer materials so that the resultant polymer structure is rigid. The resultant alignment layer therefore has an improved scratch-resistance and an increased transparency.

Moreover, the present invention utilizes the addition of aromatic diamine functional group into dianhydride to conduct the polymerization, preferably a high temperature so as to form a polyimide because of a close ring reaction. The non-polar aromatic diamine used in the present invention is 4,4'-bis(4-aminophenoxy)biphenyl) and has the following structure:

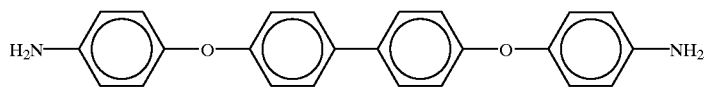

(g)
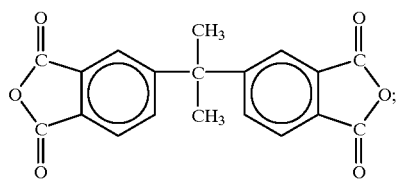

(h)
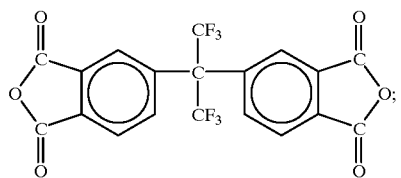

(i)
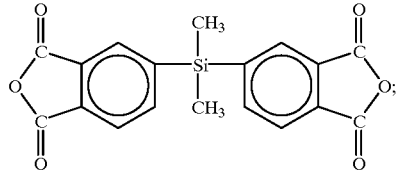

(j)
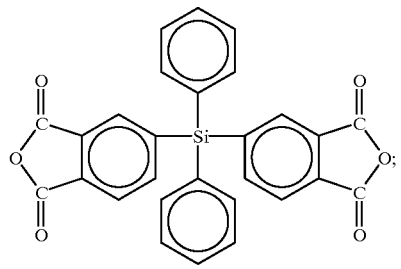

(k)
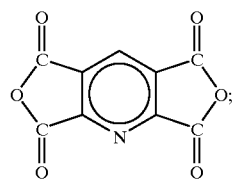

(l)
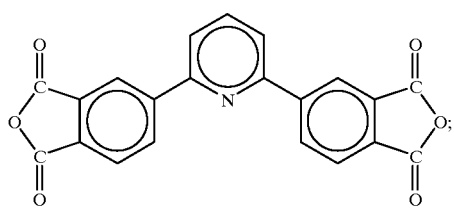

(m)
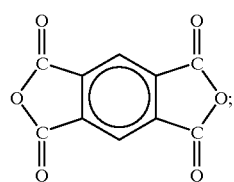

(n)
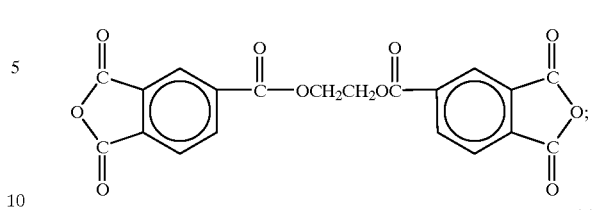

(o)
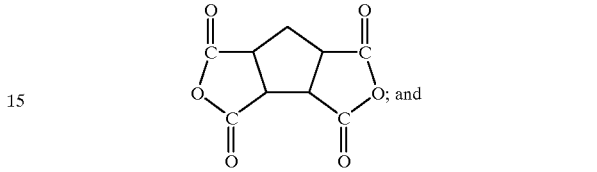

(p)
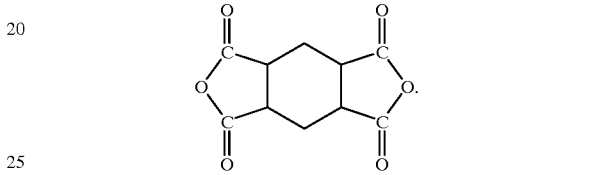

In order to have a fixed molecular weight and strength, the molar ratio of dianhydride to diamine in the alignment layer material of the present invention is from 0.8 to 1.2. When the molar ratio is approaching 1, the molecular weight becomes larger and the viscosity becomes higher. When the molar ratio is less than 1, suitable amount of end cap functional group may be added to reduce the oxidation phenomena caused by a small molar ratio. Typical end cap functional group comprises phthalic anhydride, maleic anhydride, aniline and cyclohexylamine.

For the viscosity adjustment or the convenience of dilution, organic solvent may be used in the alignment polymer material of the present invention. For example, the suitable organic solvent is N-methyl pyrrolidone (NMP), m-cresol, γ-butyllactone, N,N-dimethylacetamide (DMAc), N,N-dimethylformamide (DMF), ethylene glycol monobutyl ether (BC), or diethylene glycol monoethyl ether (EC). When BC, EC or a mixture of both is used as a solvent, the amount of solvent should be kept below 90 wt %.

The present invention also provides a process of producing a new polyamic acid alignment layer material comprising using polymerization, preferably condensation of dianhydride and aromatic diamine. The polymerization to form a polyamic acid alignment layer material is conducted for 3 minutes to 24 hours, preferably 10 minutes to 6 hours. The polymerization is conducted at a temperature in the range of −20 to 120° C., preferably 10 to 60° C. Normally, the higher the temperature, the greater the yield and the higher the viscosity. After the polymerization, the degree of polymerization is in the range of 10–5,000, preferably 40–250; and the weight average molecular weight of the resultant polyamic acid alignment layer material is 2,000–2,000,000, preferably 8,000–50,000.

If necessary, prior to adding aromatic diamine to the production process of the present invention, the reactor should be purged by nitrogen several times to remove the moisture and oxygen in the reactor. Subsequently, dianhydride is added by batch, such as by three times, to increase the molecular weight and viscosity of the obtained polymer.

Furthermore, a catalyst is optionally used to enhance the degree of polymerization of the present invention and to reduce the reaction time. The species of the catalyst can be triethylamine (TEA), diethylamine, n-butylamine (BuA) and pyridine. The catalyst improves the reaction rate but also adjusts the pH value of the reaction mixture so as to increase the polymerization degree and polymer viscosity.

In accordance with the present invention, the solid content of polyamic acid obtained from the polymerization (meaning the weight percent of polymer to solvent) is in the range of 10% to 30%. The solid content is reduced to the range of 4% to 10% for the purpose of adjusting viscosity and of controlling the layer thickness by dilution.

Dehydrating is normally necessary to form polyimide from the close ring reaction of polyamic acid. The typical method of close ring reaction is high temperature cyclization. The cyclization is conducted at a temperature in the range of 150 to 400° C., preferably of 180 to 320° C., for 3 minutes to 6 hours.

In the alignment layer material of the present invention, a small amount of silane coupling agent can be used to improve the adhesion of alignment layer. Suitable silane coupling agent includes 3-aminopropyltrimethoxysilane, 3-aminopropyltriethoxysilane, 2-aminopropyltrimethoxysilane, and 2-aminopropyltriethoxysilane.

Therefore, one embodiment of the process of producing a polyamic acid alignment layer material of the present invention is described as follows: First the stirred reactor is purged by nitrogen three times to remove the moisture and oxygen in the reactor. Aromatic diamine, such as 4, 4'-bis(4-aminophenoxy)biphenyl), is added into the reactor. After adding a solvent, the mixture of the reactor is stirred and subsequently dianhydride is added. The molar ratio of dianhydride to diamine is maintained at about 0.8 to 1.2. In order to improve the molecular weight and viscosity of the resultant polymer, a small amount of catalyst such as triethylamine (TEA) is also used. The reaction is conducted at a fixed temperature for 3 minutes to 24 hours. The reaction product is then purified. For instance, a non-solvent is used to precipitate the reaction product so as to separate the polyamic acid and solvent as well as impurities. A non-solvent may be selected from water, acetone, or toluene. The precipitate is washed by water of electronic level, acetone, or toluene and dried at a temperature of 170° C. Then a solvent such as n-methyl pyrrolidone (NMP) is added for dilution and a silane coupling agent is also used so that the solid content and viscosity of the polymer can be adjusted to a suitable desired level. After curing, the precursor of the alignment layer with appropriate thickness is obtained.

To assure the new liquid crystal alignment layer material of the present invention is capable of forming a liquid crystal alignment layer with low pretilt angle, the pretilt angle test and the preparation procedure of liquid crystal box are used to determinate the pretilt angle of the polyimide obtained from the alignment layer material of the present invention. The manufacture of liquid crystal box comprises cleaning two substrates such as indium tin oxide (ITO) glass, coating polyamic acid of the present invention on the substrates by utilizing doctor-blade casting technique or spin-coating printing, procuring and curing at high temperature, cooling, rubbing, assembling the glass, injecting liquid crystal and then testing the pretilt angle thereof. After testing, it is found that the pretilt angle of the polyimide in the inspected liquid crystal box is below 2 degrees. Therefore, the polyamic acid alignment layer material of the present invention is proven to be able to produce a liquid crystal alignment layer with a low pretilt angle.

The manner in which a low pretilt angle is achieved by the present invention resides in the polyimide and results when the polyamic acid alignment layer material is aligned in one direction after rubbing, and the liquid crystal material is also aligned while the liquid crystal material contacts the alignment layer. Particularly, the present invention makes use of specific aromatic di amine and dianhydride to form a polyamic acid alignment layer material of which the pretilt angle is controlled to be below 2 degrees. The low pretilt angle of the alignment layer will increase the working voltage of the display so that the slope of voltage (V)-transmission (T) curve, the duty ratio and the contrast become larger.

The following examples are offered as illustrations. The examples are not intended to limit the scope of the invention in any respect and should not be construed to do so.

EXAMPLES

Example 1

A one liter four-necked flask individually connected with a condenser pipe, a thermometer, a feed pipe and a stirrer was purged with nitrogen. 8.727 g of 4.4'-bis(4-aminophenoxy)biphenyl and 70 g of N-methyl pyrrolidone (NMP) as a solvent were added into the flask. After stirring for 10 minutes, 2.091 g of biphenyl tetracarboxylic dianhydride was also added. The above step was repeated twice. 15 g of NMP was then added and the mixture was stirred for 3 hours. The solids were obtained by using a large amount of toluene to precipitate the reaction product and were confirmed by IR spectrometry to be polyamic acid.

After adding 46.25 g of ethylene glycol monobutyl ether (BC), 138.75 g of NMP and 0.1 g 3-aminopropyltrimethoxysilane and stirring for 1 hour, a light yellowish solution of polyaric acid was prepared. The solution of polyamic acid was measured and its viscosity was found to be 30 centipoise (C.P.) and solid content to be 7.5%. The pretilt angle of the resulting polyimide alignment layer was also tested and found to be 1.42 degrees.

Example 2

A one liter four-necked flask individually connected with a condenser pipe, a thermometer, a feed pipe and a stirrer was purged with nitrogen. 12.949 g of 4.4'-bis(4-aminophenoxy)biphenyl and 70 g of N-methyl pyrrolidone (NMP) as a solvent were added into the flask. After stirring for 10 minutes, 2.351 g of pyromellitic dianhydride was also added. The above step was repeated twice. 10 g of NMP was then added and the mixture was stirred for 6 hours. The solids were obtained by using a large amount of toluene to precipitate the reaction product and were confirmed by IR spectrometry to be polyamic acid.

After adding 120 g of ethylene glycol monobutyl ether (BC), 360 g of NMP and 0.1 g 3-amninopropyltrimethoxysilane and stirring for 1 hour, a light yellowish solution of polyamic acid was prepared. The solution of polyamic acid was measured and its viscosity was found to be 30 C.P. and solid content to be 4%. The pretilt angle of the resulting polyimide alignment layer was also tested and found to be 1.56 degrees.

Example 3

A one liter four-necked flask individually connected with a condenser pipe, a thermometer, a feed pipe and a stirrer was purged with nitrogen. 8.153 g of 4.4'-bis(4-aminophenoxy)biphenyl and 70 g of N-methyl pyrrolidone (NMP) as a solvent were added into the flask. After stirring for 10 minutes, 2.282 g of 3,3',4,4'-benzophenone tetracarboxylic dianhydride was also added. The above step was repeated twice. 15 g of NMP was then added and the mixture was stirred for 6 hours. The solids were obtained by using a large amount of toluene to precipitate the reaction product and were confirmed by IR spectrometry to be polyamic acid.

After adding 46.25 g of ethylene glycol monobutyl ether (BC), 138.75 g of NMP and 0.1 g 3-aminopropyltiimethoxysilane and stirring for 1 hour, a light yellowish solution of polyamic acid was prepared. The solution of polyamic acid was measured and its viscosity was found to be 80 C.P. and solid content to be 7.5%. The pretilt angle of the resulting polyimide alignment layer was also tested and found to be 1.86 degrees.

Example 4

A one liter four-necked flask individually connected with a condenser pipe, a thermometer, a feed pipe and a stirrer was purged with nitrogen. 8.178 g of 4.4'-bis(4-aminophenoxy)biphenyl and 70 g of N-methyl pyrrolidone (NMP) as a solvent were added into the flask. After stirring for 10 minutes, 2.273 g of 4,4'-oxydiphthalic anhydride was also added. The above step was repeated twice. 15 g of NMP was then added and the mixture was stirred for 6 hours. The solids were obtained by using a large amount of toluene to precipitate the reaction product and were confirmed by IR spectrometry to be polyamic acid.

After adding 90 g of ethylene glycol monobutyl ether (BC), 270 g of NMP and 0.1 g 3-aminopropyltrimethoxysilane and stirring for 1 hour, a light yellowish solution of polyamic acid was prepared. The solution of polyamic acid was measured and its viscosity was found to be 40 C.P. and solid content to be 4%. The pretilt angle of the resulting polyimide alignment layer was also tested and found to be 1.2 degrees.

Example 5

A one liter four-necked flask individually connected with a condenser pipe, a thermometer, a feed pipe and a stirrer was purged with nitrogen. 9.372 g of 4.4'-bis(4-aminophenoxy)biphenyl and 70 g of N-methyl pyrrolidone (NMP) as a solvent were added into the flask. After stirring for 10 minutes, 0.244 g of biphenyl tetracarboxylic dianhydride and 1.631 g of pyromellitic dianhydride were also added. The above step was repeated twice. 15 g of NMP was then added and the mixture was stirred for 3 hours. The solids were obtained by using a large amount of toluene to precipitate the reaction product and were confirmed by IR spectrometry to be polyamic acid.

After adding 46.25 g of ethylene glycol monobutyl ether (BC), 138.75 g of NMP and 0.1 g 3-aminopropyltrimethoxysilane and stirring for 1 hour, a light yellowish solution of polyamic acid was prepared. The solution of polyamic acid was measured and its viscosity was found to be 90 C.P. and solid content to be 7.5%. The pretilt angle of the resulting polyimide alignment layer was also tested and found to be 1.45 degrees.

Example 6

A one liter four-necked flask individually connected with a condenser pipe, a thermometer, a feed pipe and a stirrer was purged with nitrogen. 8.377 g of 4.4'-bis(4-aminophenoxy)biphenyl and 70 g of N-methyl pyrrolidone (NMP) as a solvent were added into the flask. After stirring for 10 minutes, 1.867 g of biphenyl tetracarboxylic dianhydride and 0.240 g of 3,3',4,4'-benzophenone tetracarboxylic dianhydride were also added. The above step was repeated twice. 15 g of NMP was then added and the mixture was stirred for 3 hours. The solids were obtained by using a large amount of toluene to precipitate the reaction product and were confirmed by IR spectrometry to be polyamic acid.

After adding 58.75 g of ethylene glycol monobutyl ether (BC), 176.25 g of NMP and 0.1 g 3-aminopropyltrimethoxysilane and stirring for 1 hour, a light yellowish solution of polyamic acid was prepared. The solution of polyarnic acid was measured and its viscosity was found to be 45 C.P. and solid content to be 6%. The pretilt angle of the resulting polyimide alignment layer was also tested and found to be 1.66 degrees.

Comparative Example 1

A one liter four-necked flask individually connected with a condenser pipe, a thermometer, a feed pipe and a stirrer was purged with nitrogen. 8.924 g of 2,2'-bis(4-[4-aminophenoxy]phenyl)propane) and 70 g of N-methyl pyrrolidone (NMP) as a solvent were added into the flask. After stirring for 10 minutes, 2.025 g of biphenyl tetracarboxylic dianhydride was also added. The above step was repeated twice. 15 g of NMP was then added and the mixture was stirred for 3 hours. The solids were obtained by using a large amount of toluene to precipitate the reaction product and were confirmed by IR spectrometry to be polyamic acid.

After adding 46.25 g of ethylene glycol monobutyl ether (BC), 138.75 g of NMP and 0.1 g 3-aminopropyltrimethoxysilane and stirring for 1 hour, a light yellowish solution of polyamic acid was prepared. The solution of polyamic acid was measured and its viscosity was found to be 80 C.P. and solid content to be 7.5%. The pretilt angle of the resulting polyimide alignment layer was also tested and found to be 3.56 degrees.

Comparative Example 2

A one liter four-necked flask individually connected with a condenser pipe, a thermometer, a feed pipe and a stirrer was purged with nitrogen. 7.247 g of 4,4'-oxydianiline and 70 g of N-methyl pyrrolidone (NMP) as a solvent were added into the flask. After stirring for 10 minutes, 2.579 g of pyromellitic dianhydride was also added. The above step was repeated twice. 15 g of NMP was then added and the mixture was stirred for 3 hours. The solids were obtained by using a large amount of toluene to precipitate the reaction product and were confirmed by IR spectrometry to be polyamic acid.

After adding 46.25 g of ethylene glycol monobutyl ether (BC), 138.75 g of NMP and 0.1 g 3-aminopropyltrimethoxysilane and stirring for 1 hour, a light yellowish solution of polyamic acid was prepared. The solution of polyamic acid was measured and its viscosity was found to be 90 C.P. and solid content to be 7.5%. The pretilt angle of the resulting polyimide alignment layer was also tested and found to be 4.14 degrees.

Comparative Example 3

A one liter four-necked flask individually connected with a condenser pipe, a thermometer, a feed pipe and a stirrer was purged with nitrogen. 6.170 g of 3,3'-dihydroxy-4,4'-diamino biphenyl and 70 g of N-methyl pyrrolidone (NMP) as a solvent were added into the flask. After stirring for 10 minutes, 2.942 g of 3,3',4,4'-benzophenone tetracarboxylic dianhydride was also added. The above step was repeated twice. 15 g of NMP was then added and the mixture was stirred for 6 hours. The solids were obtained by using a large amount of toluene to precipitate the reaction product and were confirmed by IR spectrometry to be polyamic acid.

After adding 46.25 g of ethylene glycol monobutyl ether (BC), 138.75 g of NMP and 0.1 g 3-aminopropyltrimethoxysilane and stirring for 1 hour, a light yellowish solution of polyarnic acid was prepared. The solution of polyamic acid was measured and its viscosity was found to be 80 C.P. and solid content to be 7.5%. The pretilt angle of the resulting polyimide alignment layer was also tested and found to be 3.96 degrees.

The structure of aromatic diarnine used in each example and comparative example, as well as the solid content, pretilt angle, and thermal cracking temperature of each example and comparative example are shown in the following Table 1.

TABLE 1

| | Structure of aromatic diamine | Solid content (%) | Pretilt angle (degree) |
|---|---|---|---|
| Example 1 | ![structure] | 7.5 | 1.42 |
| Example 2 | ![structure] | 4.0 | 1.56 |
| Example 3 | ![structure] | 7.5 | 1.86 |
| Example 4 | ![structure] | 4.0 | 1.20 |

TABLE 1-continued
| | Structure of aromatic diamine | Solid content (%) | Pretilt angle (degree) |
|---|---|---|---|
| Example 5 | 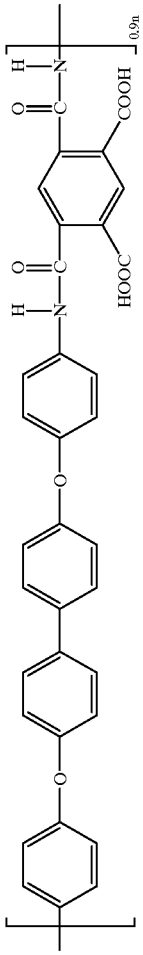 | 7.5 | 1.45 |
| Example 6 | 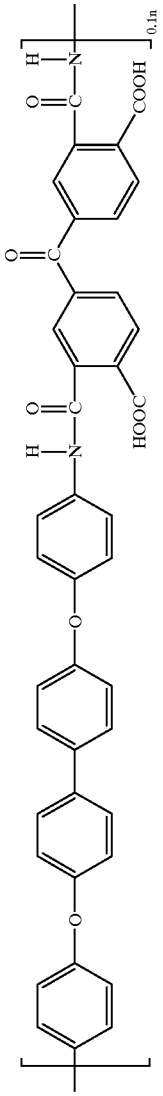 | 6 | 1.66 |

TABLE 1-continued

| | Structure of aromatic diamine | Solid content (%) | Pretilt angle (degree) |
|---|---|---|---|
| Comp. Example 1 | [structure: aromatic diamine with isopropylidene-bis(phenoxy-phenyl) linked to biphenyl dicarboxylic acid diamide] | 7.5 | 3.56 |
| Comp. Example 2 | [structure: phenoxy-phenyl aromatic diamine linked to benzene tetracarboxylic acid diamide] | 7.5 | 4.14 |
| Comp. Example 3 | [structure: dihydroxybiphenyl diamine linked to benzophenone dicarboxylic acid diamide] | 7.5 | 3.96 |

From the properties of the polyamic acid alignment layer material obtained in each example and comparative example, particularly the pretilt angle as shown in Table 1, it can be found that the pretilt angle of the polyamic acid alignment layer material in Examples 1–6 according to the present invention is obviously lower than that in Comparative Examples 1–3. That is, the present invention provides a new polyamic acid alignment layer material capable of forming a pretilt angle of below 2 degrees which can be used in a TN type liquid crystal display, particularly a TN type liquid crystal display with high duty ratio.

While the invention has been described with respect to certain preferred exemplifications and embodiments, it is not intended to limit the scope of the invention thereby, but solely by the claims appended hereto.

we claim:

1. A polyamic acid alignment layer material for use in producing a pretilt angle of below 2 degrees, wherein the polyamic acid has the following repeating units:

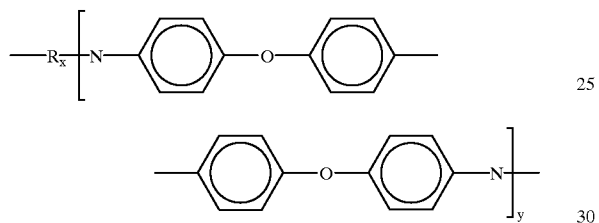

wherein a ratio of x to y is 0.8 to 1.2 and R is tetracarboxyl and is selected from the group consisting of

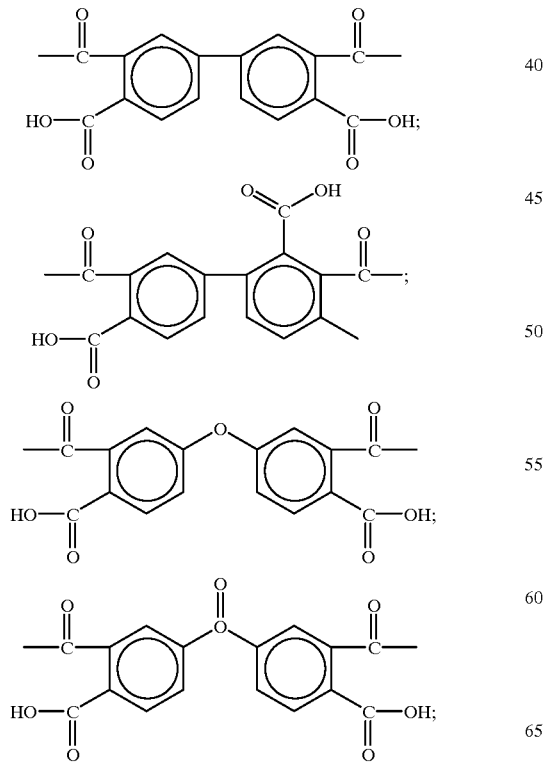

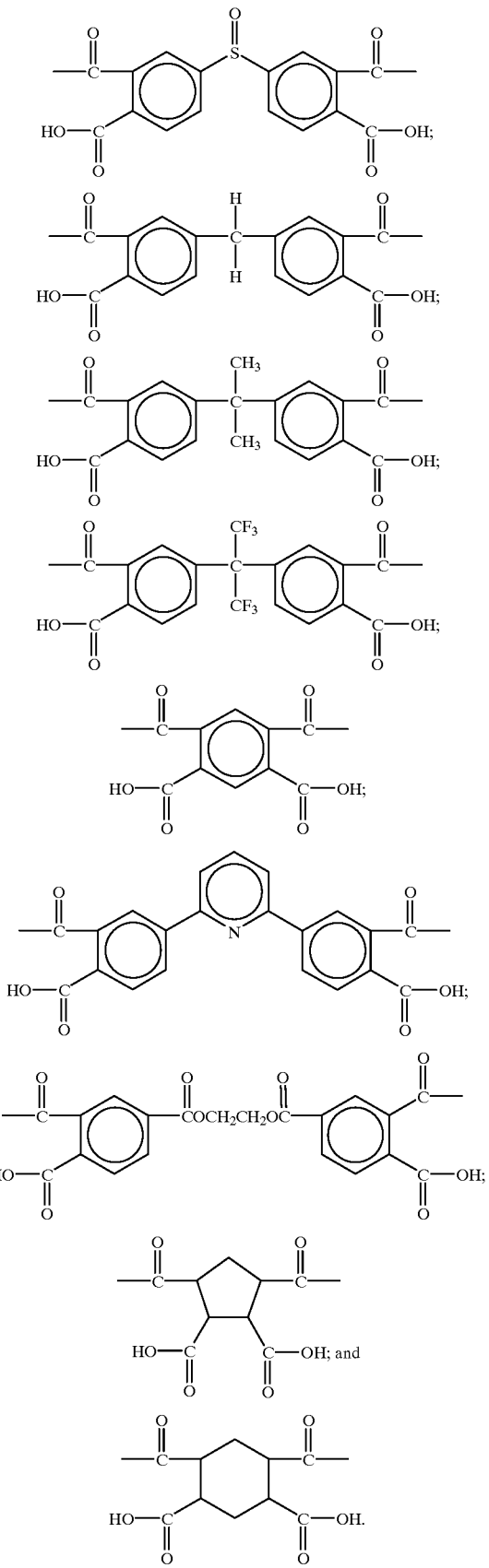

2. A polyamic acid alignment layer material according to claim 1, wherein the polyamic acid is obtained by a condensation polymerization of dianhydride with aromatic diamine, wherein the aromatic diamine is 4,4'-bis(4-aminophenoxy)biphenyl, and the dianhydride is selected from the group consisting of

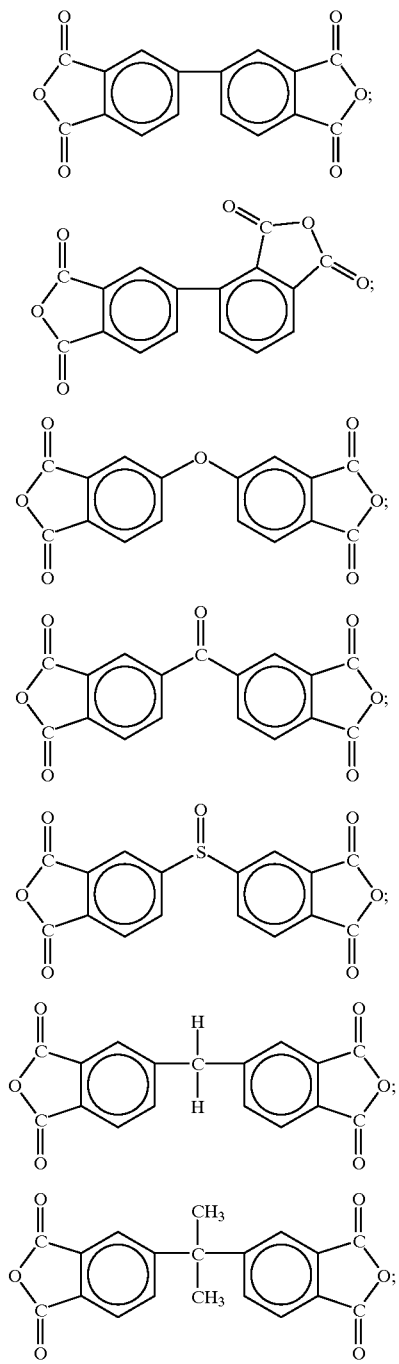

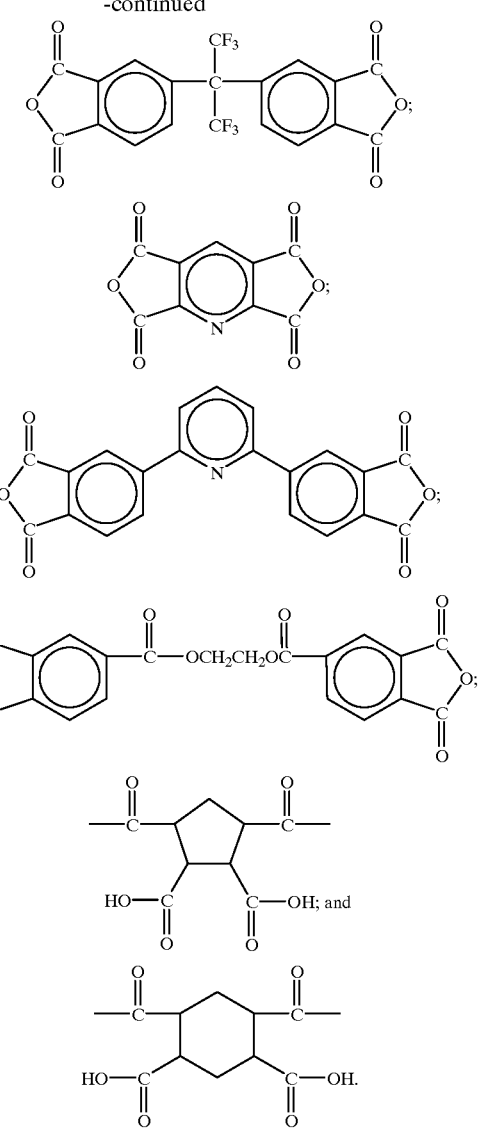

3. A polyamic acid alignment layer to claim 1, wherein the degree of polymerization of the polyamic acid is in the range of 10–5,000.

4. A polyamic acid alignment layer according to claim 1, wherein the degree if polymerization of the polyamic acid is in the range of 40–250.

5. A polyamic acid alignment layer according to claim 1, wherein the weight average molecular weight of the polyamic acid is 2,000–2,000,000.

6. A polyamic acid alignment layer according to claim 1, wherein the weight average molecular weight of the polyamic acid is 8,000–50,000.

* * * * *